Figure 1:
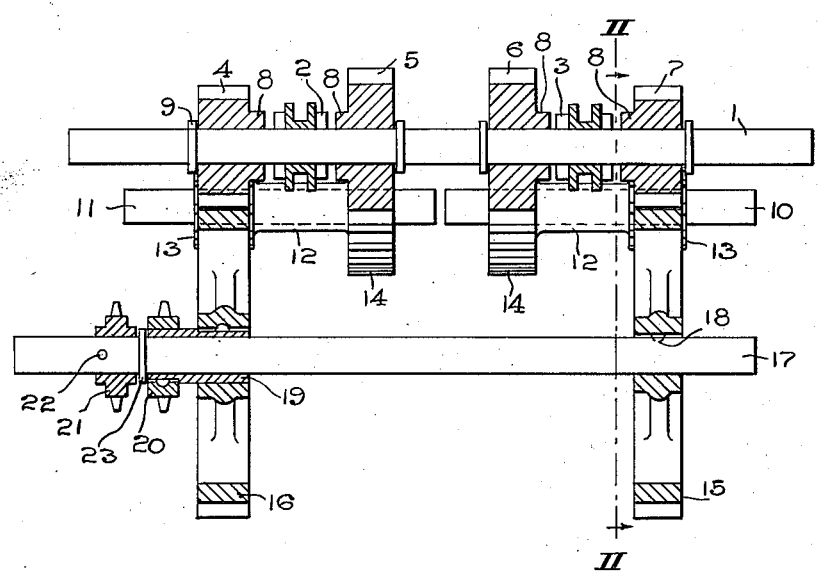

May 29, 1928. 1,671,475

L. H. KEIM

POWER TRANSMITTING MECHANISM

Filed May 15, 1924

WITNESSES:
R. S. Harrison
W. B. Jaspert.

INVENTOR
Lester H. Keim
BY
Wesley G. Carr
ATTORNEY

Patented May 29, 1928.

1,671,475

UNITED STATES PATENT OFFICE.

LESTER H. KEIM, OF CRAFTON, PENNSYLVANIA, ASSIGNOR TO R. D. NUTTALL COMPANY, A CORPORATION OF PENNSYLVANIA.

POWER-TRANSMITTING MECHANISM.

Application filed May 15, 1924. Serial No. 713,441.

My invention relates to power transmitting mechanisms of the type capable of effecting a change in direction of rotation between a plurality of co-operative rotating elements and to change the relative speeds of such elements.

It is among the objects of my invention to provide a power transmitting mechanism comprising a plurality of rotating elements which shall be capable of simultaneously effecting rotation of said elements in opposite directions or in the same direction, which shall be capable of completely changing the direction of rotation of the several driven members with a single source of power, and which shall accomplish such changes of rotation without interrupting the power unit.

It is a further object of my invention to provide a power transmitting mechanism of the above designated character which shall be of simple, compact and durable mechanical construction, comprising a minimum number of parts and which shall be efficient for facilitating a change in direction of rotation without requiring undue precaution in the manipulation of the device.

My power transmitting mechanism is especially applicable where it is necessary to provide a plurality of drive spindles rotating in opposite directions and where it is desirable to obtain the power for driving such members from a single source. A specific instance of such requirements is found in earth-boring machinery where the rotation of the boring tool and the advance and removal of the same is effected through independent driving members arranged to function co-ordinately through a transmitting mechanism.

It is obvious that where such multiplicity of functions can be produced by a single source of power, as an electric motor or the like, a great saving of expensive equipment, space and auxiliary apparatus is effected.

Figure 2:
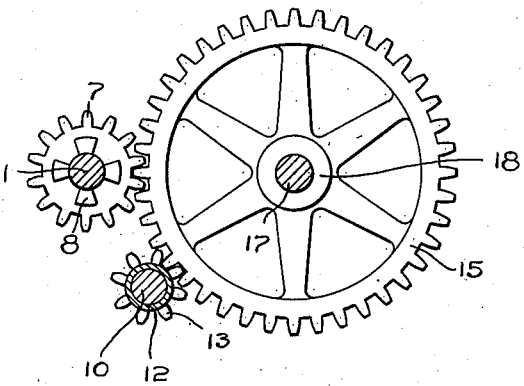

In the accompanying drawing constituting a part hereof and in which like reference characters designate like parts:

Fig. 1 is a longitudinal view, partially in section and partially in elevation, of a power transmitting mechanism embodying the principles of my invention, and Fig. 2 is an end elevational view thereof.

The mechanism comprises a drive shaft 1 having double acting square jaw clutches 2 and 3 splined thereon and having a plurality of gear wheels 4, 5, 6 and 7, journaled for rotation in suitable spaced relation as shown in Fig. 1. The gear wheels are provided with clutch faces 8 corresponding to the faces of the clutches 2 and 3 to permit engagement therewith and a plurality of spacing collars or shoulders 9 are provided on the shaft 1 to maintain proper relation and alinement of the respective gear wheels. A plurality of short intermediate shafts 10 and 11 are mounted in co-operative alinement with the drive shaft 1 and each of the said shafts has a sleeve or spool gear 12 which is provided with gear tooth portions 13 and 14, the latter being meshed with the gear wheels 5 and 6, and the former being in co-operative engagement with driven gear wheels 15 and 16, mounted on the shaft 17.

The wheel 15 is positively secured to the shaft 17 by a key 18 and the wheel 16 is secured in a similar manner to a sleeve 19 having a sprocket wheel 20 mounted on its opposite end, the sleeve 19 being journalled for rotation on the shaft 17. Another sprocket wheel 21 is fixed on the shaft 17 by a pin 22 or other suitable securing means. A spacing collar 23 is disposed intermediate the sprocket wheels to maintain alinement of the sleeve 19. A motor or other source of power (not shown) is coupled to the shaft 1 to actuate the same.

The operation of this device is briefly as follows: The drive shaft 1 is actuated by energizing the source of driving power coupled therewith and when the clutch members 2 and 3 are positioned as shown in Fig. 1, the several gear wheels and the parallel shafts 10 and 17 are stationary. By shifting the clutch 3 on the shaft 1 in engagement with the clutch face 8 of the gear wheel 7, the gear wheel 15 is rotated by a direct engagement or meshing of the teeth of the wheels 7 and 15 which causes a rotation of the shaft 17 in a direction opposite to that of the drive shaft. By reversing the clutch 3 to engage with the gear wheel 6, the sleeve 12 will rotate on the shaft 10 by virtue of the engagement of its tooth periphery 14 with the wheel 6 which causes the pinion member 13 to actuate the wheel 15 which rotates the shaft 17 in the direction of rotation of the shaft 1.

In like manner by shifting the clutch 2 to engage with the gear wheels 4 and 5 a similar effect is obtained in the rotation of the gear wheel 16 and its connecting sprocket wheel 20. It is obvious that where it is desired to rotate the sprocket wheels 20 and 21 in the same direction it will be necessary to obtain rotation in the same direction of the gear wheels 15 and 16 and this is readily accomplished by shifting the clutches 2 and 3 into engagement with the gear wheel corresponding to such rotation of said wheels.

To illustrate, by shifting the clutch 3 into engagement with the gear wheel 7, the gear wheel 15, the shaft 17 on which it is mounted and sprocket 21 will be rotated in a direction opposite to the direction of rotation of the shaft 1. To obtain a like rotation of the sprocket gear 20 it will be necessary to obtain a rotation of the gear wheel 16 in a direction opposite to the direction of rotation of the shaft 1 which is accomplished by shifting the clutch 2 in engagement with the gear wheel 4.

Where it is desired to obtain opposite direction of rotation for the sprocket wheels 20 and 21, the clutch member 2 must be engaged with the gear wheel 5 when the clutch 3 is engaged with the wheel 7 and the engagement of the clutch 2 must be with the wheel 4 when the clutch 3 is engaged with the gear wheel 6. In like manner it will follow that by engaging the clutch 3 with the gear wheel 6, the direction of rotation of the shaft 17 and the sprocket wheel 21 secured thereto will be in the same direction of rotation as the shaft member 1, and to obtain the opposite direction of rotation for the sprocket wheel 20, the clutch 2 must be engaged with the gear wheel 4.

As shown in the drawing, the respective gear wheels are so proportioned as to maintain a uniform speed between the relative positions of the clutch member, that is, the speeds of the sprocket wheels 20 and 21 will be the same irrespective of whether they are actuated through the gear wheels 7 and 15, and 4 and 16 or through the intermediate sleeve members and irrespective of their direction of rotation whether they be the same or opposite.

It is evident from the foregoing description of my invention that a power transmitting mechanism made in accordance therewith provides a simple and efficient means for obtaining a change of direction of rotation of a power device without reducing the power ratios and requiring but a single source of driving energy. It is also obvious that a plurality of changes in direction of motion may be effected in a simple manner. The clutches are operated by the usual shifting devices such as clutch levers and the like connected to a suitable linkage through which the operations are controlled, but which do not constitute any part of my invention.

Although I have described a specific embodiment of my invention it will be obvious to those skilled in the art that various modifications may be made in the details of construction, the design and proportion of the several co-operating parts and the connecting mediums for the driving and driven shafts without departing from the principles herein set forth.

I claim as my invention:

1. The combination with a driving shaft and a driven shaft, of a pair of intermediate shafts, a plurality of gear wheels journalled for rotation on said driving shaft, a pair of clutches adapted for engagement with said gears having spline connections to said driving shaft, sleeve gears for said intermediate shafts, a sleeve for said driven shaft, a gear wheel mounted on said sleeve, a gear wheel mounted on one end of said driven shaft and means for actuating said sleeve and driven shaft through the medium of said intermediate sleeve gears, to provide relative motion of said driving and driven shafts and the sleeve mounted on the latter.

2. The combination with a driving shaft having a plurality of gear-wheels journalled thereon, and a pair of clutches each adapted to co-operate with one of a pair of said gear-wheels to operatively connect it to the driving shaft; of a driven shaft having a sleeve journalled thereon, gear-wheels mounted on the driven shaft and on said sleeve, each being in engagement with a gear-wheel on the driving shaft, and a pair of intermediate shafts having spool gears journalled thereon, each in engagement with a gear-wheel on the driving shaft, one of said spool gears being also in engagement with a gear-wheel on the driven shaft and the other with a gear-wheel on said sleeve.

3. The combination with a driving shaft having a plurality of gear-wheels journalled thereon, of a driven shaft having a gear-wheel mounted thereon for engagement with a gear-wheel mounted thereon for engagement with a gear-wheel on the driving shaft, a sleeve journalled on said driven shaft and a gear-wheel mounted on said sleeve for engagement with a gear-wheel on the driving shaft, a pair of intermediate shafts, spool gears mounted on said intermediate shafts for engaging respectively with gear-wheels on the driven shaft and on the driving shaft and with gear-wheels on the sleeve and on the driving shaft, and clutches splined on the driving shaft for engaging the gear-wheels journalled thereon.

In testimony whereof, I have hereunto subscribed my name this 30th day of April, 1924.

LESTER H. KEIM.